Nov. 3, 1925.
J. M. MEREDITH
MOTOR VEHICLE WHEEL
Filed March 24, 1925
1,560,185
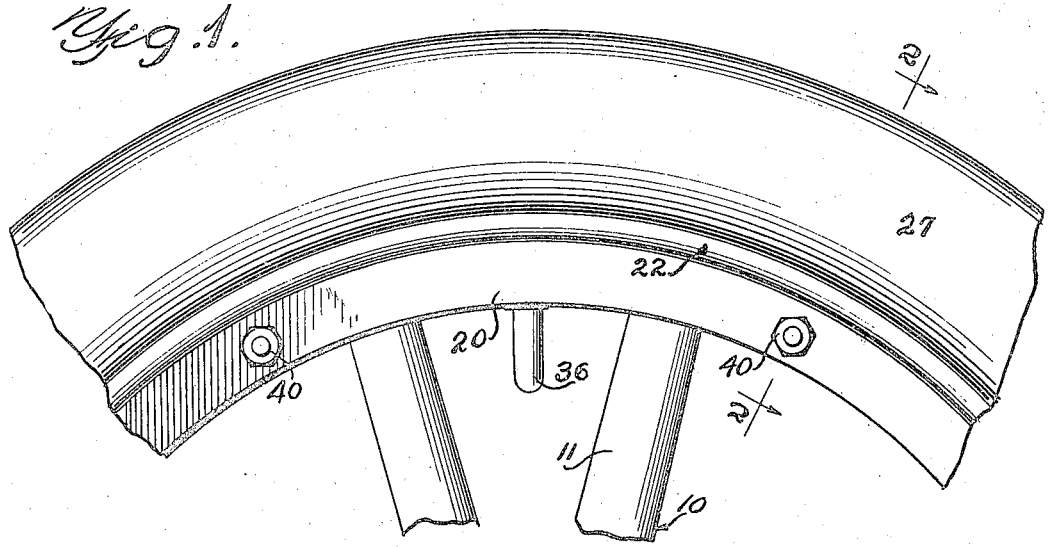
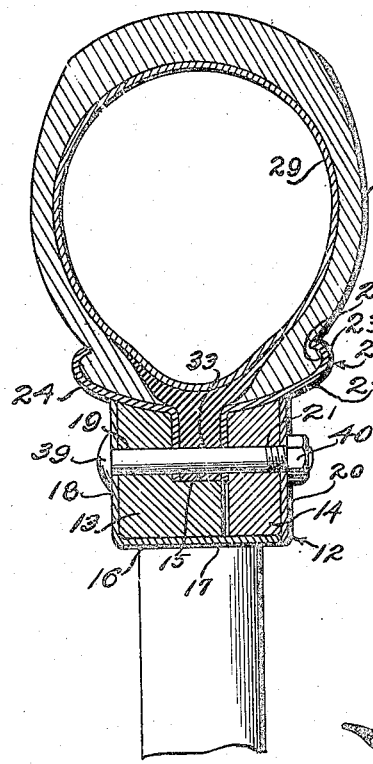
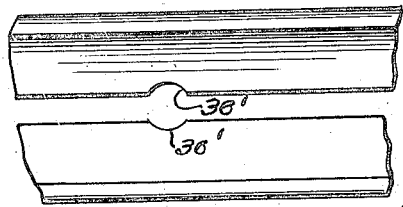
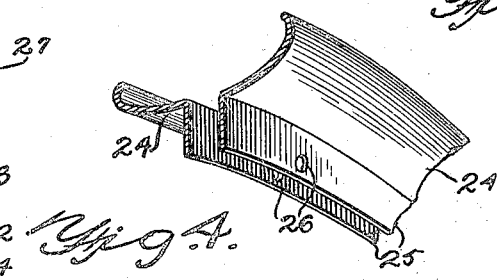
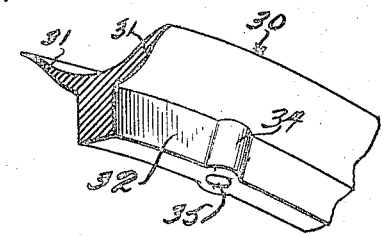
Inventor
Jaquelin M. Meredith
By
Attorney Patented Nov. 3, 1925.

1,560,185

UNITED STATES PATENT OFFICE.

JAQUELIN M. MEREDITH, OF NORFOLK, VIRGINIA.

MOTOR-VEHICLE WHEEL.

Application filed March 24, 1925. Serial No. 17,980.

*To all whom it may concern:*

Be it known that I, JAQUELIN M. MEREDITH, a citizen of the United States, residing at Norfolk, in the county of Norfolk and State of Virginia, have invented certain new and useful Improvements in Motor-Vehicle Wheels, of which the following is a specification.

This invention relates to wheels for motor vehicles and more particularly to a combination felly and rim adapted to support motor vehicle tires of the standard types.

An important object of the invention is to provide a longitudinally split rim and a wheel felly therefor whereby the rim may be detached from the felly and the sections thereof separated to permit easy removal of the tire.

A further object is to provide a device of the above mentioned character which will be particularly suitable for use in connection with clincher tires.

A still further object is to provide a device of the above mentioned character which includes a tire flap having an inwardly extending radial portion adapted to be received and clamped between the rim sections to prevent leakage of water into the tire when the device is in operation.

A still further object is to provide a rim which is split longitudinally and provided with inwardly extending radial flanges adapted to be received in an annular channel formed in the wheel felly, one side of the felly being removable to permit withdrawal of the rim from the wheel.

Other objects and advantages of the invention will be apparent during the course of the following description.

In the drawings, I have shown several embodiments of the invention. In this showing:

Figure 1 is a side elevation of a portion of a wheel embodying the invention,

Figure 2 is a section on line 2—2 of Figure 1,

Figure 3 is a detail view of a portion of the rim sections,

Figure 4 is a similar view of a portion of one form of flap,

Figure 5 is a detail sectional view through a second form of flap,

Figure 6 is a similar view through a further modified form of flap, and,

Figure 7 is a plan view of a portion of the rim detached.

Referring to the drawings, the numeral 10 designates a wheel having spokes 11 and a felly indicated as a whole by the numeral 12. The felly comprises a stationary section 13 and a removable section 14. The stationary section of the felly is provided with an annular groove or channel 15, as clearly shown in Figure 2. The section 13 of the felly is arranged in a metal support 16 having a base portion 17 secured to the spokes of the wheel and a side portion 18. The portion of the felly just described is provided with a plurality of transverse openings 19 suitably spaced throughout the circumference of the felly. As shown in Figure 2, the base 17 of the metal support is adapted to project a substantial distance beyond the felly section 13 and is adapted to be received within the felly section 14, as shown. A metallic side piece 20 may be secured to the felly section 14 and the latter, together with the plate 20 may be provided with suitable spaced transverse openings 21 corresponding in arrangement to the openings 19.

The numeral 22 designates as a whole a rim having flanges 23 at its outer edges. The rim 22 is formed of a pair of longitudinal sections 24 each of which is provided at its inner end with an inwardly extending radial flange 25, as shown in Figures 2 and 3. The flanges 25 are spaced a substantial distance and are adapted to engage against the inner faces of the felly sections 13 and 14 as clearly shown. The flanges 25 are provided with spaced transverse openings 26 arranged in alinement with the openings 19 and 21.

The numeral 27 designates an ordinary automobile tire shown in the present instance as a clincher tire having the usual beads 28 adapted to be arranged by the flanges 23 of the rim. The tire 27 is adapted to receive the usual inner tube 29, as shown in Figure 2. The numeral 30 designates a tire flap preferably formed of flexible rubber having oppositely extending portions 31 adapted to be arranged between the base portions of the tire and the inner tube, as will be obvious. The flap 30 is further provided with an inwardly extending radial flange 32 adapted to be received between the flanges 25 of the rim sections. The flange 32 is also provided with openings 33 corresponding in arrangement to the transverse openings in the felly sections and flange 25. The flange 32 is provided at one portion in its length with a radial thickened portion 34 having an opening 35 extending therethrough to receive the valve 36 of the inner tube of the tire. It will be obvious that this valve also projects through the felly to permit the inner tube to be inflated. As shown in detail in Figure 7 of the drawings, the rim sections are provided with opposite curved portions 36' to permit the passage of the enlarged section 34 through the rim sections.

In Figure 5 of the drawings I have shown a modified form of tire flap which is generally similar to the form previously described. In the modified form, however, I provide a reinforcing wire 37 extending throughout the length of the flap to provide reinforcement when desired. In the form of the flap shown in Figure 6, the upper portion of the flap is provided with a reinforcing layer of suitable fabric 38. Bolts 39 extend through the transverse openings in the felly, rim and flap and are provided at one end with nuts 40 as will be obvious.

The operation of the device is as follows:

The inner tube 29 is arranged within the tire 27 and the flap placed in proper position. The rim sections 24 are then applied to their proper position from opposite sides of the tire with the various transverse openings in proper alinement. With the bolts 39 and felly section 14 removed, the rim is placed in position with the flanges 25 thereof arranged in the channel 15. The felly section 14 is then replaced and the bolts inserted whereupon the nuts may be arranged on the bolts and tightened to secure the tire to the rim. It will be obvious that the tire may be removed merely by removing the bolts 39 and withdrawing the felly section 14 from the side of the wheel to permit withdrawal of the rim. The rim sections then easily may be removed from the tire. It will be obvious that the tightening of the nuts 20 securely grips the flanges 25 against the flange 32 of the flap to prevent water or other foreign material from entering the tire.

It is to be understood that the forms of my invention herewith shown and described are to be taken as preferred examples of the same and that various changes in the shape, size and arrangement of parts may be made without departing from the spirit of the invention or the scope of the subjoined claims.

I claim:

1. In combination, a wheel felly, a rim split longitudinally to provide a pair of sections, a tire flap having portions adapted to be arranged between a tire and inner tube carried by said rim, said flap having a portion extending between said rim sections, and means carried by said felly for clamping said rim sections against the extended portion of said flap and to said felly.

2. In combination, a wheel felly, a rim split longitudinally to provide a pair of sections, each section having parallel inwardly extending radial flanges, a tire flap having portions adapted to be arranged between a tire and inner tube carried by said rim, said flap having an inwardly extending circumferential flange arranged between the flanges of said rim sections, and means carried by said felly for clamping the flanges of said rim sections against the flange of said flap and to said felly.

3. A device constructed in accordance with claim 2, wherein said felly is provided with a circumferential channel to receive said flange, said clamping means being adapted to secure said flanges against one wall of said channel.

4. In combination, a wheel felly comprising stationary and removable sections cooperating to form a central annular channel, a pair of circular rim sections surrounding said felly and provided at their inner edges with portions extending inwardly into said channel, a tire flap having portions adapted to be arranged between a tire and inner tube carried by said rim, said flap having portions extending between the inwardly extending portions of said rim, and means carried by said felly for clamping the sections thereof against the inwardly extending portions of said rim.

5. In combination, a wheel felly comprising stationary and removable sections cooperating to form a central annular channel, a pair of circular rim sections surrounding said felly and provided at their inner edges with inwardly extending parallel circumferential flanges arranged in said channel, a tire flap having portions adapted to be arranged between a tire and inner tube carried by said rim, said flap being further provided with a central flange extending inwardly between the flanges of said rim sections, and bolts passing through said felly sections and the flanges of said flap and said rim sections.

6. A device constructed in accordance with claim 5, wherein the flange of said flap is formed of compressible material adapted to be compressed by the flanges of said rim sections when said bolts are tightened to provide a leak-proof joint between said flanges.

In testimony whereof I affix my signature.

JAQUELIN M. MEREDITH.